United States Patent
Mege et al.

(10) Patent No.: US 9,467,218 B2
(45) Date of Patent: Oct. 11, 2016

(54) INTERFERENCE REDUCTION METHOD

(71) Applicant: AIRBUS DS SLC, Elancourt (FR)

(72) Inventors: Philippe Mege, Bourg la Reine (FR); Laurent Martinod, Le Chesney (FR); Luc Fety, Paris (FR); Olivier Perrin, Saint-Aubin-d'Écrosville (FR); Nicolas Gregis, Fresnes (FR)

(73) Assignee: AIRBUS DS SLC, Elancourt (FR)

( * ) Notice: Subject to any disclaimer, the term of this patent is extended or adjusted under 35 U.S.C. 154(b) by 16 days.

(21) Appl. No.: 14/362,199

(22) PCT Filed: Nov. 28, 2012

(86) PCT No.: PCT/EP2012/004911
§ 371 (c)(1),
(2) Date: Jun. 2, 2014

(87) PCT Pub. No.: WO2013/079191
PCT Pub. Date: Jun. 6, 2013

(65) Prior Publication Data
US 2014/0321584 A1     Oct. 30, 2014

(30) Foreign Application Priority Data
Dec. 1, 2011   (FR) ...................................... 11 61062

(51) Int. Cl.
*H04L 1/02*   (2006.01)
*H04B 7/08*   (2006.01)
*H04L 1/00*   (2006.01)

(52) U.S. Cl.
CPC ........... *H04B 7/0851* (2013.01); *H04L 1/0055* (2013.01)

(58) Field of Classification Search
CPC ............ H04L 27/2647; H04B 7/0848; H04B 7/0842

USPC ................................................. 375/341, 346
See application file for complete search history.

(56) References Cited

U.S. PATENT DOCUMENTS

| 7,769,117 B2 * | 8/2010 | Heikkila et al. ............... 375/346 |
| 2009/0274235 A1 * | 11/2009 | Lee et al. ...................... 375/267 |

FOREIGN PATENT DOCUMENTS

| EP | 1158696 | 11/2001 |
| FR | 2924884 | 6/2009 |

OTHER PUBLICATIONS

International Search Report for Int. App. No. PCT/EP2012/004911, completed Feb. 27, 2013.

* cited by examiner

*Primary Examiner* — David S Huang
(74) *Attorney, Agent, or Firm* — Pillsbury Winthrop Shaw Pittman LLP

(57) ABSTRACT

This interference reduction method in a receiver (2) comprising at least two antennas (4, 6), each receiving a signal transmitted through a radio propagation channel, comprises the following steps: —weighting (20) of each of the signals received with a weighting vector associated respectively with a respective antenna of the receiver; —combination (22) of the weighted signals received to obtain a combined received signal; —weighting (24) of a reference signal with another weighting vector; —comparison (26) of the combined received signal and the weighted reference signal to obtain an error; and —determination (28) of the weighting vectors with the help of the maximum a posteriori criterion by maximizing the probability of realization of the said weighting vectors conditionally with the error obtained.

8 Claims, 2 Drawing Sheets

INTERFERENCE REDUCTION METHOD

This invention relates to a method for reducing interference in a multi-antenna receiver. It also relates to corresponding multi-antenna reception equipment and a computer program.

A multi-antenna receiver comprises at least two reception antennas in order to receive replicas of the same signal emitted, thus introducing additional diversity and resulting in an improvement of the reception quality. The additional diversity provided is either spatial diversity if the two antennas are sufficiently distanced, or polarisation diversity if the antennas are co-located and polarised in different ways, or a share of both of these two types of diversity.

The invention particularly relates to multicarrier transmission systems, for example of the OFDM (Orthogonal Frequency Division Multiplexing) type. Such multicarrier transmission provides frequency diversity that is independent of the spatial diversity and/or polarisation diversity provided by the use of several reception antennas.

This type of transmission is used increasingly frequently. It has particularly been adopted in LTE (Long Term Evolution), TEDS (TETRA Enhanced Data Service), DAB (Digital Audio Broadcasting) and DVB-T (Digital Video Broadcasting-Terrestrial) systems.

In OFDM transmission systems, data are generally organised in frames. In each frame, some symbols distributed in the time-frequency plane are inserted among the useful information intended for the receiver. These symbols, called "pilot symbols" are known to the emitter and the receiver. They are generally used for synchronising and estimating the propagation channel.

Noise and interference affect the signal while it is being propagated between the emitter and the receiver and degrade signal reception. Deficient treatment of noise and interference then leads to a high rate of demodulation and decoding errors.

Conventionally, noise and interference are treated by comparing a signal that results from the combination of the signals received by the antennas of the receiver with an estimation of the signal emitted. Such an estimation of the emitted signal may be known in advance to the receiver, for example through the use of pilot symbols. The estimation of the signal emitted can also be obtained by the preliminary processing of the signals received on the different antennas, for example through a technique known under the name Maximum Ratio Combining (MRC).

The document FR2924884 describes a method for reducing interference in a receiver comprising at least two antennas that each receive a signal transmitted through a radio propagation channel. According to that method, the signals received and an estimation of the emitted signal are weighted using weighting vectors defined in vector subspaces representing the time and frequency variations of the propagation channel, for the signals received, and the convolution of the propagation channel with itself, for the estimation of the emitted signal. Even though the method is more efficient than conventional methods using the MRC technique, the constraint imposed on the weighting vectors does however limit the performance of the method.

This invention aims to improve the situation.

To that end, the invention firstly concerns a method for reducing interference in a receiver comprising at least two antennas, each receiving a signal transmitted through an associated radio propagation channel, the received signals corresponding with the same emitted signal comprising frames of symbols distributed in time and frequency, among which some symbols, called pilot symbols, are known to the receiver, where the said method comprises the following steps:

weighting of each of the signals received with a weighting vector associated respectively with a respective antenna of the receiver;

combination of the weighted signals received to obtain a combined received signal;

weighting of a reference signal comprising pilot symbols with another weighting vector;

comparison of the combined received signal and the weighted reference signal to obtain an error; and determination of the weighting vectors with the help of the maximum a posteriori criterion by maximising the probability of realisation of the said weighting vectors conditionally with the error obtained.

Pilot symbol means any symbol known to the receiver, that is both pilot symbols as designated in the standards of the known OFDM systems such as LTE and TEDS and/or synchronisation symbols and/or symbols that have already been demodulated and determined by the receiver in an earlier processing step.

Thanks to the use of the Maximum A Posterior (MAP) approach, this invention makes it possible to optimally reduce the level of interference in a multi-antenna receiver and thus improve the Signal to Noise plus Interference Ratio (SNIR).

Advantageously, the determination step comprises the sub-steps of:

computation of a covariance matrix $G_B$ of the propagation channel;

computation of a covariance matrix $G_D$ of the propagation channel convoluted with itself; and determination of the weighting vectors with the help of covariance matrices $G_B$ and $G_D$.

Indeed, the weighting vectors are homogeneous with the propagation channel. The covariance matrices $G_B$ and $G_D$ make it possible to represent the time and frequency constraints of that channel.

Preferentially, the determination step further comprises a sub-step consisting in decomposing the covariance matrix $G_B$ into eigenvectors according to the relation $G_B = C_B \Lambda_B C_B^H$ in which $C_B$ is an eigenvector matrix of the matrix $G_B$ and $\Lambda_B$ is a diagonal matrix comprising the eigenvalues associated with the eigenvectors of the matrix $G_B$ and a sub-step consisting in decomposing the covariance matrix $G_D$ into eigenvectors according to the relation $G_D = C_D \Lambda_D C_D^H$ in which $C_D$ is an eigenvector matrix of the matrix $G_D$ and $\Lambda_D$ is a diagonal matrix comprising the eigenvalues associated with the eigenvectors of the matrix $G_D$.

These decompositions make it possible to simplify the computations of the weighting vectors.

In one embodiment, the determination step further comprises a sub-step consisting in extracting a matrix $C'_B$ from the matrix $C_B$ and a matrix $\Lambda'_B$ from the matrix $\Lambda_B$, the matrix $\Lambda'_B$ comprising a definite number $n'_B$ of eigenvalues of $\Lambda_B$ and the matrix $C'_B$ comprising the eigenvectors associated with these $n'_B$ eigenvalues, and a sub-step consisting in extracting a matrix $C'_D$ from the matrix $C_D$ and a matrix $\Lambda'_D$ from the matrix $\Lambda_D$ the matrix $\Lambda'_D$ comprising a definite number $n'_D$ of eigenvalues of $\Lambda_D$ and the matrix $C'_D$ comprising the eigenvectors associated with those $n'_D$ eigenvalues, the weighting vectors being then determined with the help of the eigenvector matrices $C'_B$ and $C'_D$ and eigenvalue matrices $\Lambda'_B$ and $\Lambda'_D$.

Preferentially, the $n'_B$ eigenvalues selected are the largest eigenvalues of the matrix $\Lambda_B$ and the $n'_D$ eigenvalues selected are the largest eigenvalues of the matrix $\Lambda_D$.

That makes it possible to reduce the complexity of the weighting vectors while minimising the loss of performance thanks to the fact that the eigenvectors retained in the matrices $C'_B$ and $C'_D$ represent the largest part of the energy, represented by the sum of the eigenvalues retained in the matrices $\Lambda'_B$ and $\Lambda'_D$.

Preferentially, $n'_B$ and $n'_D$ are smaller than or equal to the number of pilot symbols in each frame.

In a preferred embodiment, the covariance matrix $G_B$ is the Kronecker product of a covariance matrix $G_{B,T}$ in the time domain and a covariance matrix $G_{B,F}$ in the frequency domain and the covariance matrix $G_D$ is the Kronecker product of a covariance matrix $G_{D,T}$ in the time domain and a covariance matrix $G_{D,F}$ in the frequency domain, and the determination step comprises the following sub-steps:

decomposition of the covariance matrices $G_{B,T}$ and $G_{B,F}$ into eigenvectors according to the relations $G_{B,T}=C_{B,T}\Lambda_{B,T}C_{B,T}^H$ and $G_{B,F}=C_{B,F}\Lambda_{B,F}C_{B,F}^H$, in which:

$C_{B,T}$ is an eigenvector matrix of the matrix $G_{B,T}$;

$\Lambda_{B,T}$ is a diagonal matrix comprising eigenvalues associated with the eigenvectors of the matrix $G_{B,T}$;

$C_{B,F}$ is an eigenvector matrix of the matrix $G_{B,F}$; and $\Lambda_{B,F}$ is a diagonal matrix comprising eigenvalues associated with the eigenvectors of the matrix $G_{B,T}$;

extraction of a matrix $C'_{B,T}$ from the matrix $C_{B,T}$ and a matrix $\Lambda'_{B,T}$ from the matrix $\Lambda_{B,T}$, the matrix $\Lambda'_{B,T}$ comprising a definite number $n_{Bt}'$ of the largest eigenvalues of $\Lambda_{B,T}$ and the matrix $C'_{B,T}$ comprising the eigenvectors associated with these $n_{Bt}'$ largest eigenvalues;

extraction of a matrix $C'_{B,F}$ from the matrix $C_{B,F}$ and a matrix $\Lambda'_{B,F}$ from the matrix $\Lambda_{B,F}$, the matrix $\Lambda'_{B,F}$ comprising a definite number $n_{Bf}'$ of the largest eigenvalues of $\Lambda_{B,F}$ and the matrix $C'_{B,F}$ comprising the eigenvectors associated with these $n_{Bf}'$ largest eigenvalues, decomposition of the covariance matrices $G_{D,T}$ and $G_{D,F}$ into eigenvectors according to the relations $G_{D,T}=C_{D,T}\Lambda_{D,T}C_{D,T}^H$ and $G_{D,F}=C_{D,F}\Lambda_{D,F}C_{D,F}^H$, in which:

$C_{D,T}$ is an eigenvector matrix of the matrix $G_{D,T}$;

$\Lambda_{D,T}$ is a diagonal matrix comprising eigenvalues associated with the eigenvectors of the matrix $G_{D,T}$;

$C_{D,F}$, is an eigenvector matrix of the matrix $G_{D,F}$; and $\Lambda_{D,F}$ is a diagonal matrix comprising eigenvalues associated with the eigenvectors of the matrix $G_{D,F}$;

extraction of a matrix $C'_{D,T}$ from the matrix $C_{D,T}$ and a matrix $\Lambda'_{D,T}$ from the matrix $\Lambda_{D,T}$, the matrix $\Lambda'_{D,T}$ comprising a definite number $n_{Dt}'$ of the largest eigenvalues of $\Lambda_{D,T}$ and the matrix $C'_{D,T}$ comprising the eigenvectors associated with these $n_{Dt}'$ largest eigenvalues; and extraction of a matrix $C'_{D,F}$ from the matrix $C_{D,F}$ and a matrix $\Lambda'_{D,F}$ from the matrix $\Lambda_{D,F}$, the matrix $\Lambda'_{D,F}$ comprising a definite number $n_{Df}'$ of the largest eigenvalues of $\Lambda_{D,F}$ and the matrix $C'_{D,F}$ comprising the eigenvectors associated with these $n_{Df}'$ largest eigenvalues, the weighting vectors being then determined with the help of the eigenvector matrices $C'_{B,T}$, $C'_{B,F}$, $C'_{D,T}$, $C'_{D,F}$ and the eigenvalue matrices $\Lambda'_{B,T}$, $\Lambda'_{B,F}$, $\Lambda'_{D,T}$, $\Lambda'_{D,F}$.

The Kronecker product of the two matrices A and B, the matrix A having the components $(a_{ij})$, where i is an integer between 1 and m and j is an integer between 1 and n, is the matrix product noted $A \hat{\otimes} OB$ and defined by the following expression:

$$A \otimes B = \begin{pmatrix} a_{11}B & \cdots & \cdots & a_{1n}B \\ \vdots & \cdots & \cdots & \vdots \\ a_{m1}B & \cdots & \cdots & a_{mn}B \end{pmatrix}.$$

That use of the separability of the covariance matrix between the time domain and the frequency domain makes it possible to further reduce the complexity of the calculation of the weighting vectors while guaranteeing performance that is very close to that obtained by using the totality of the covariance matrix.

Advantageously, the emitted signal is a multicarrier signal, particularly an OFDM signal.

The invention can also apply to single carrier systems.

The invention also concerns reception equipment comprising at least two antennas capable, each, of receiving a signal transmitted through an associated radio propagation channel, the received signals corresponding with the same emitted signal comprising frames of symbols distributed in time and frequency, among which some symbols, called pilot symbols, are known to the receiver, where the said reception equipment comprises means for the following:

weighting of each of the signals received with a weighting vector associated respectively with a respective antenna of the receiver;

combination of the weighted signals received to obtain a combined received signal;

weighting of a reference signal comprising pilot symbols with another weighting vector;

comparison of the combined received signal and the weighted reference signal to obtain an error; and determination of the weighting vectors with the help of the maximum a posteriori criterion by maximising the probability of realisation of the said weighting vectors conditionally with the error obtained.

The invention also relates to a computer program comprising instructions for implementing the method in to the invention when the program is executed by at least one processor.

The chart in FIG. 3 is a schematic illustration of the execution of the computer program.

Embodiments of the invention will now be described in a more precise but non-limitative manner by reference to the drawings attached where:

FIG. 1 represents reception equipment 2 of an OFDM transmission system, such as for example a base station or a mobile terminal of a PMR (Professional Mobile Radio) system of the TEDS type.

Figure 1:
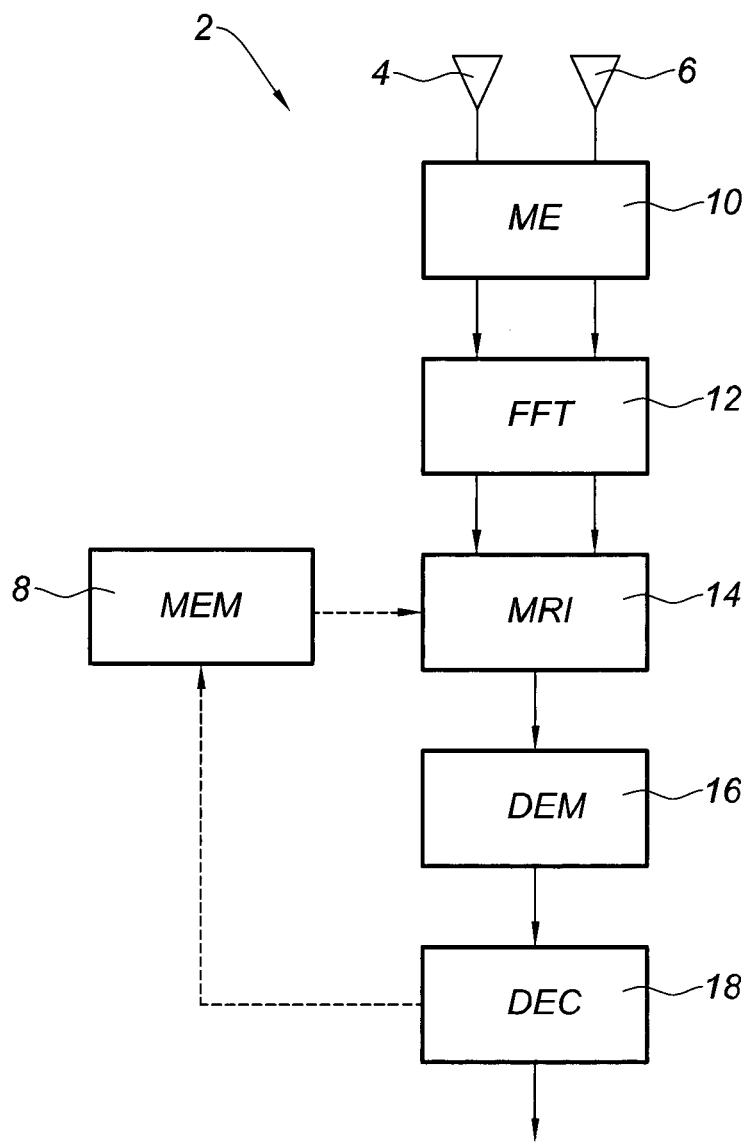
FIG. 1 is a diagram of reception equipment according to the invention.

The receiver 2 comprises two antennas 4, 6 for the reception of two signals corresponding with the same OFDM signal transmitted from an emitter through two radio propagation channel associated with the antennas 4, 6. The channels associated with the antennas 4, 6 are assumed to meet identical physical constraints.

The OFDM signal emitted by the emitter is organised in frames of symbols distributed in time and frequency, among which some symbols, called pilot symbols, are known to the receiver 2 and are stored in a memory 8 of the said receiver 2. Each frame thus comprises n symbol with of subcarriers $n_f$ and $n_t$ time symbols, n being equal to the product of $n_f$ and $n_t$.

The receiver 2 comprises an input module 10 comprising stages for amplification, baseband forming, sampling and guard interval removal.

The receiver 2 also comprises means 12 for the time-frequency conversion of the signals received by the antennas 4, 6 processed by the input module 10 to convert them from the time domain to the frequency domain. Those time frequency conversion means 12 use a Fast Fourier Transform.

The receiver 2 further comprises an interference reduction module 14 that makes it possible to reduce the level of interference in a useful signal resulting from the combination of the signals received by the two antennas 4, 6. Such interference may be due, for example, to the presence of jammers emitting on the same radio channel as the emitter and/or the multiple signal propagation journeys.

The interference reduction module 14 is capable of supplying data symbols in which the contribution of interference is minimised.

A demodulator 16 of the receiver 2 makes it possible to demodulate those data symbols into demodulated bits using the same modulation technique as that used in the emitter. The demodulator 16 is further arranged to determine the likelihood of each demodulated bit. The likelihood of a bit has a negative or positive soft value, compared to a hard value such as the binary value "1" or "0" to indicate that the demodulator is delivering actual floating values, each with a sign that imposes a subsequent decision, by a decoder 18 of the receiver 2, about the status of the corresponding bit, that is to say a decision about the 'hard' value "0" or "1".

The decoder 18 thus makes it possible to decode the demodulated bits supplied by the demodulator 16 on the basis of the likelihoods determined earlier. The decoder 18 implements decoding corresponding with the encoding used while emitting the signal, for example convolution decoding that corrects errors using the Viterbi algorithm.

Figure 2:
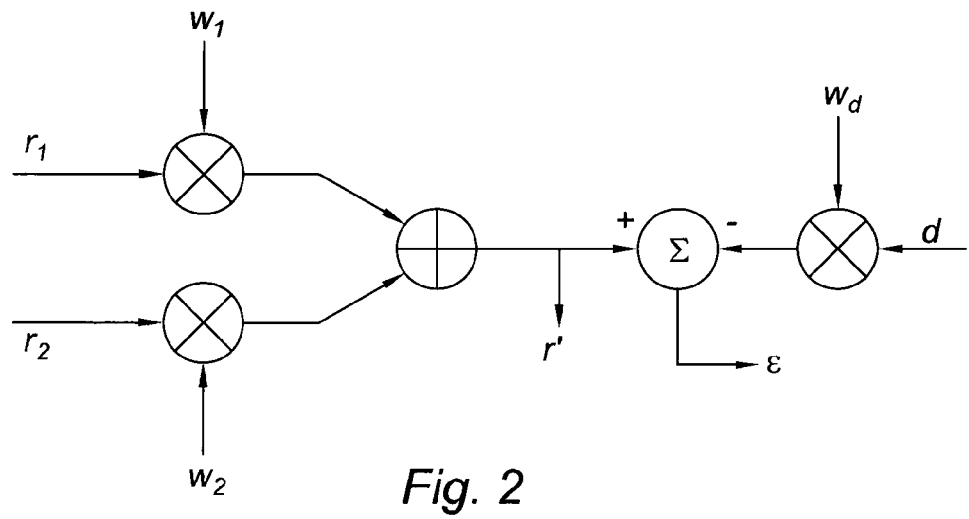
FIG. 2 is a diagram illustrating the working principle of the interference reduction method.

FIG. 2 illustrates the principle of the interference reduction method used by the interference reduction module 14.

By noting the signals received on antennas 4 and 6 as $r_1$ and $r_2$ respectively, the principle used by this invention consists in applying weightings $w_1$ and $w_2$ respectively to the signals $r_1$ and $r_2$, then combining the two weighted signals, for example by summing them, to obtain a signal r' from which an estimation of the emitted signal d weighted by weighting $w_d$ is subtracted. The resulting difference E represents a residual error.

The method according to the invention advantageously uses the maximum a posteriori method to compute the most probable weightings knowing the error.

Figure 3:
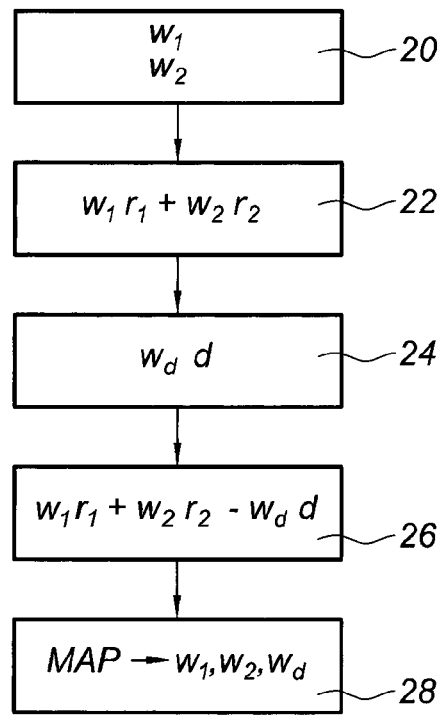
FIG. 3 is a chart illustrating the working of the interference reduction method according to the invention.

The steps of the method are described by reference to the chart in FIG. 3.

During a first step 20, the interference reduction module 14 weights the received signals $r_1$ and $r_2$ respectively by the weighting vectors $w_1$ and $w_2$, the content of which is to be determined.

In step 22, the interference reduction module 14 combines, by summing them here, the signals $r_1$ and $r_2$ weighted to form a combined signal r'.

In step 24, the interference reduction module 14 weights a reference signal d, comprising the pilot symbols, with another weighting vector $w_d$, the value of which is to be determined.

The vectors $w_1$, $w_2$ and $w_d$ are column vectors, each containing as many lines as symbols contained in the received signal, or n lines.

In step 26, the interference reduction module 14 determines an error ϵ corresponding with the difference between the combined signal r' and the weighted reference signal.

Thus, by noting as w the vector consisting in a concatenation of the vectors $w_1$, $w_2$ and $w_d$ and R, the matrix comprising the signals received and the reference signal defined according to the expression:

$$R = \left[ \begin{bmatrix} r_{1,0,0} & 0 & \cdots & 0 \\ 0 & r_{1,\ldots} & 0 & \cdots \\ \cdots & 0 & r_{1,\ldots} & 0 \\ 0 & \cdots & 0 & r_{1,n_f,n_t} \end{bmatrix} \begin{bmatrix} r_{2,0,0} & 0 & \cdots & 0 \\ 0 & r_{2,\ldots} & 0 & \cdots \\ \cdots & 0 & r_{2,\ldots} & 0 \\ 0 & \cdots & 0 & r_{2,n_f,n_t} \end{bmatrix} \right.$$

$$\left. \begin{bmatrix} -d_{0,0} & 0 & \cdots & 0 \\ 0 & -d_{\ldots} & 0 & \cdots \\ \cdots & 0 & -d_{\ldots} & 0 \\ 0 & \cdots & 0 & -d_{n_f,n_t} \end{bmatrix} \right],$$

the error ϵ is a vector expressed by ϵ=R.w.

In step 28, the interference reduction module 14 calculates the vectors $w_1$, $w_2$ and $w_d$ using the MAP approach.

The approach consists in maximising the probability of realisation of the weighting vector w. That probability is conditional upon the observation of the error ϵ.

Using Bayes' formula, that probability is equal to the probability that the error ϵ is observed conditionally upon the probability that the weighting is equal to the vector w, that conditional probability being multiplied by the probability that the weighting vector w is realised. That is expressed by the following relation:

$$P(w)=f(w/\epsilon) \propto f(\epsilon/w) \cdot f(w),$$

where P and f indicate probabilities and the symbol ∝ indicates the relation "equivalent to".

But the weighting vectors $w_1$, $w_2$ and $w_d$ are related to the propagation channel. That channel is dependent on constraints relating to its maximum time spread, due to reflections off far obstacles, and its maximum frequency speed, due to the speed of the reception equipment and the carrier frequency, that is the Doppler spread.

Firstly, in the frequency domain, the frequency spread of the channel, called the Doppler spread, due to reflections off near obstacles is limited. The spread ranges between $-F_D$ and $+F_D$, where $F_D$ is the maximum Doppler frequency given by the relation $$F_D = \frac{v}{c} \cdot F_p,$$

in which v is the speed of the receiver 2, c is the speed of light and $F_p$ is the carrier frequency. The components of the frequency spectrum of the propagation channel along the frequency axis thus lie between these limits $-F_D$ and $+F_D$.

Secondly, the time spread of the channel due to reflections off far obstacles is limited. That time spread depends on the frequency band used and the environment. For example, at a carrier frequency of 400 MHz in an urban environment, the time spread is of the order of 5 µs whereas in a mountainous environment, the spread is of the order of 15 µs. The components of the time response of channel are thus located between fixed limits for given environmental conditions.

The limits of the frequency spectrum and the time response of the channel are known to the receiver 2 and are stored in the memory 8.

These characteristics of the propagation channel are represented by a matrix called the overall covariance matrix G.

Due to the constraints expressed in the overall covariance matrix G, the probability of occurrence of the weighting vector w is given by the expression:

$$f(w) = \beta \times e^{-1/2 \cdot w^H G^{-1} w}$$

in which $\beta$ is a constant and the notation $X^H$ indicates that it is a conjugate transpose matrix X.

Further, under the hypothesis that the channel noise is of the Gaussian type, the conditional probability of observation of the error $\epsilon$ is given by the expression:

$$f(\epsilon/w) = \alpha \times e^{-\|R \cdot w\|^2/(2 \cdot \sigma^2)}$$

where $\alpha$ is a constant and $\sigma^2$ represents the variance of noise in the signal corresponding with the signals received on the different antennas, weighted and combined.

Thus, the probability of realisation, expressing the MAP criterion of the weighting vector w is given by the following expression [1]:

$$P(w) = \alpha \times e^{\frac{\|R \cdot w\|^2}{(2 \cdot \sigma^2)}} \times \beta \times e^{-1/2 w^H G^{-1} w}. \quad [1]$$

Further, the variance, or power, $\sigma^2$ is equal to:

$$\sigma^2 = \sigma_1^2 \|w_1\|^2 + \sigma_2^2 \|w_2\|^2,$$

in which $\sigma_1^2$ is the noise variance on the first antenna 4 and $\sigma_2^2$ is the noise variance on the second antenna 6.

Assuming that the noise power is the same on both antennas, that is that $\sigma_1^2 = \sigma_2^2$ total noise variance is thus equal to a $\sigma^2 = \sigma_1^2(\|w_1\|^2 + \|w_2\|^2)$.

Taking the opposite of the logarithm of the expression [1], the following expression [2] is obtained:

$$L(P(w)) = \frac{\|R \cdot w\|^2}{\sigma_1^2(\|w_1\|^2 + \|w_2\|^2)} + w^H G^{-1} w + cst, \quad [2]$$

where cst is a constant value.

The interference reduction module 14 aims to minimise that logarithm L(P(w)).

Besides, the covariance matrix G is a block diagonal matrix constituted by concatenation of covariance matrices corresponding with each of the weighting vectors $w_1$, $w_2$ and $w_d$.

The covariance matrix of $w_1$ is the same as that of $w_2$, given that the two weighting vectors $w_1$ and $w_2$ are both homogeneous with a propagation channel, in the case of two reception antennas. That covariance matrix is noted $G_B$ and represents the time and frequency constraints relating to the propagation channel.

The propagation vector $w_d$ is homogeneous with the convolution of two propagation channels, in the case of two reception antennas. The corresponding covariance matrix $G_D$ represents the time and frequency constraints relating to such a convolution.

The covariance matrix G could thus be written thus:

$$G = \begin{pmatrix} G_B & 0 & 0 \\ 0 & G_B & 0 \\ 0 & 0 & G_D \end{pmatrix}.$$

Further, the following constraint is imposed:

$$k^2 = \|w_1\|^2 + \|w_2\|^2 = cst_2.$$

That constraint does not limit the solutions to the problem of the minimisation of the expression [2]. That is because regardless of the value of $k^2$, the solution w does not change, as changing that constant would only multiply the solution by a scalar constraint.

In what follows, $k^2$ is fixed to 2. That makes it possible to consider that the weightings $w_1$ and $w_2$ each have unit power. Then the matrix $G_B$ is the standardised covariance matrix, that is to say it is obtained with average unit power of the channel, and the matrix $G_D$ is the covariance matrix corresponding with the convolution of two channels with unit power. As a result, $\sigma_2$ represents the inverse of the signal to noise ratio observed on any one of the antennas.

A target signal to noise ratio may be fixed, which value does not change regardless of the effective value of the noise power and the useful signal power. Other solutions are possible, such as estimating the signal to noise ratio as the information is received and demodulated, for example with pilot symbols that are known to the emitter and the receiver. In that case, it is possible to adapt the signal to noise ratio dynamically in the channel estimation process.

The expression [2] may thus be written:

$$L(P(w)) = \frac{\|R \cdot w\|^2}{2 \cdot \sigma_1^2} + w^H G^{-1} w + cst.$$

The minimisation problem of step 28 is thus a problem of optimisation with a constraint, which is resolved with Lagrange multipliers according to the following relation:

$$\nabla_w(L(P(w))) = \left(\frac{R^H R}{2 \cdot \sigma_1^2} + G^{-1}\right) w - \mu N^H N w$$

where $\nabla_w$ designates the gradient in relation to the weighting vector w and the matrix N is the identity matrix for the two signals received at the antennas 4, 6 and the zero matrix for the reference signal.

In other terms, the matrix N may be written:

$$N = \begin{pmatrix} 1 & 0 & \cdots & \cdots & \cdots & \cdots & \cdots & 0 \\ 0 & \ddots & \ddots & & & & & \vdots \\ \vdots & \ddots & 1 & \ddots & & & & \vdots \\ \vdots & & \ddots & 1 & \ddots & & & \vdots \\ \vdots & & & \ddots & \ddots & \ddots & & \vdots \\ \vdots & & & & \ddots & 1 & \ddots & \vdots \\ \vdots & & & & & \ddots & 0 & \ddots & \vdots \\ \vdots & & & & & & \ddots & \ddots & 0 \\ 0 & \cdots & \cdots & \cdots & \cdots & \cdots & 0 & 0 \end{pmatrix}.$$

The minimisation of the gradient then provides the following expression [3]:

$$\nabla_w(L(P(w))) = 0 \Rightarrow \left(\frac{R^H R}{2 \cdot \sigma_1^2} + H\right)w, \quad [3]$$
$$= \mu N^H N w$$

where the matrix H is equal to the inverse of the covariance matrix G.

The weighting vector w solution to the minimisation problem is thus a generalised eigenvector of both the term $$\left(\frac{R^H R}{2 \cdot \sigma_1^2} + H\right)$$

and the term $N^H N$ and $\mu$ is the associated generalised eigenvalue.

Further, the solution must verify the relation $L(P(w))=\mu+$ cst.

Thus, the weighting vector w minimising $L(P(w))$ is the generalised eigenvector corresponding with the smallest generalised eigenvalue $\mu$.

In a preferred embodiment, in order to reduce the complexity of the computations, the covariance matrices $G_B$ and $G_D$ are decomposed in step 28 into eigenvectors and eigenvalues in the following manner:

$$\begin{cases} G = \begin{pmatrix} G_B & 0 & 0 \\ 0 & G_B & 0 \\ 0 & 0 & G_D \end{pmatrix} \\ \begin{cases} G_B = C_B \cdot \Lambda_B \cdot C_B^H \\ G_D = C_D \cdot \Lambda_D \cdot C_D^H \end{cases} \Rightarrow \begin{cases} G_B^{-1} = C_B \cdot \Lambda_B^{-1} \cdot C_B^H \\ G_D^{-1} = C_D \cdot \Lambda_D^{-1} \cdot C_D^H \end{cases} \end{cases}$$

where the matrices $C_B$ and $C_D$ are the eigenvector matrices of the matrices $G_B$ and $G_D$ respectively and the matrices $\Lambda_B$ and $\Lambda_D$ are respectively the corresponding eigenvalue diagonal matrices.

The covariance matrix G may thus be written $G=C\Lambda C^H$, where C is an eigenvector matrix of the matrix G and $\Lambda$ is a diagonal matrix comprising eigenvalues associated with the eigenvectors of the matrix G.

Thus, the inverse matrix of the covariance matrix G is equal to:

$$\begin{cases} G^{-1} = \begin{pmatrix} C_B \cdot \Lambda_B^{-1} \cdot C_B^H & 0 & 0 \\ 0 & C_B \cdot \Lambda_B^{-1} \cdot C_B^H & 0 \\ 0 & 0 & C_D \cdot \Lambda_D^{-1} \cdot C_D^H \end{pmatrix} \\ soit \\ G^{-1} = C \cdot \Lambda^{-1} \cdot C^H \end{cases}$$

In one embodiment, the complexity of computation is further reduced by retaining only some eigenvalues of the covariance matrix G and the corresponding eigenvectors. In that case, a matrix C' is extracted from the matrix C and a matrix $\Lambda'$ is extracted from the matrix $\Lambda$, the matrix $\Lambda'$ comprising a definite number n' of eigenvalues of $\Lambda$ and the matrix C' comprising the eigenvectors associated with those n' eigenvalues. The weighting vector w is then determined with the help of eigenvector matrices C' and eigenvalue matrices $\Lambda'$.

In a preferred embodiment, the covariance matrix G is a block diagonal matrix, made up of the matrices $G_B$, $G_B$ and $G_D$, and for which each of the matrices $G_B$ and $G_D$ is the Kronecker product of a matrix $G_{B,T}$, respectively $G_{D,T}$, with covariance in the time domain, and a matrix $G_{B,F}$, respectively $G_{D,F}$, with covariance in the frequency domain, and the determination step includes the sub-steps of:

decomposition of the covariance matrices $G_{B,T}$ and $G_{B,F}$ into eigenvectors according to the relations $G_{B,T}=C_{B,T}\Lambda_{B,T}C_{B,T}^H$ and $G_{B,F}=C_{B,F}\Lambda_{B,F}C_{B,F}^H$, in which:
  $C_{B,T}$ is an eigenvector matrix of the matrix $G_{B,T}$;
  $\Lambda_{B,T}$ is a diagonal matrix comprising eigenvalues associated with the eigenvectors of the matrix $G_{B,T}$;
  $C_{B,F}$ is an eigenvector matrix of the matrix $G_{B,F}$; and
  $\Lambda_{B,F}$ is a diagonal matrix comprising eigenvalues associated with the eigenvectors of the matrix $G_{B,F}$;

extraction of a matrix $C'_{B,T}$ from the matrix $C_{B,T}$ and a matrix $\Lambda'_{B,T}$ from the matrix $\Lambda_{B,T}$, the matrix $\Lambda'_{B,T}$ comprising a definite number $n_{Bt}'$ of the largest eigenvalues of $\Lambda_{B,T}$ and the matrix $C'_{B,T}$ comprising the eigenvectors associated with these $n_{Bf}'$ largest eigenvalues; and extraction of a matrix $C'_{B,F}$ from the matrix $C_{B,F}$ and a matrix $\Lambda'_{B,F}$ from the matrix $\Lambda_{B,F}$ the matrix $\Lambda'_{B,F}$ comprising a definite number $n_{Bf}'$ of the largest eigenvalues of $\Lambda_{B,F}$ and the matrix $C'_{B,F}$ comprising the eigenvectors associated with these $n_{Bf}'$ largest eigenvalues.

decomposition of the covariance matrices $G_{D,T}$ and $G_{D,F}$ into eigenvectors according to the relations $G_{D,T}=C_{D,T}\Lambda_{D,T}C_{D,T}^H$ and $G_{D,F}=C_{D,F}\Lambda_{D,F}C_{D,F}^H$ in which:
  $C_{D,T}$ is an eigenvector matrix of the matrix $G_{D,T}$;
  $\Lambda_{D,T}$ is a diagonal matrix comprising eigenvalues associated with the eigenvectors of the matrix $G_{D,T}$;
  $C_{D,F}$ is an eigenvector matrix of the matrix $G_{D,F}$; and
  $\Lambda_{D,F}$ is a diagonal matrix comprising eigenvalues associated with the eigenvectors of the matrix $G_{D,F}$;

extraction of a matrix $C'_{D,T}$ from the matrix $C_{D,T}$ and a matrix $\Lambda'_{D,T}$ from the matrix $\Lambda_{D,T}$, the matrix $\Lambda'_{D,T}$ comprising a definite number $n_{Dt}'$ of the largest eigenvalues of $\Lambda_{D,T}$ and the matrix $C'_{D,T}$ comprising the eigenvectors associated with these $n_{Dt}'$ largest eigenvalues; and extraction of a matrix $C'_{D,F}$ from the matrix $C_{D,F}$ and a matrix $\Lambda'_{D,F}$ from the matrix $\Lambda_{D,F}$, the matrix $\Lambda'_{D,F}$ comprising a definite number $n_{Df}'$ of the largest eigenvalues of $\Lambda_{D,F}$ and the matrix $C'_{D,F}$ comprising the eigenvectors associated with these $n_{Df}'$ largest eigenvalues.

The weighting vector w is then determined with the help of eigenvector matrices $C'_{B,T}$, $C'_{B,F}$, $C'_{D,T}$, $C'_{D,F}$ and eigenvalue matrices $\Lambda'_{B,T}$, $\Lambda'_{B,F}$, $\Lambda'_{D,T}$, $\Lambda'_{D,F}$ Going back to the expression [3] and using the decomposition into eigenvectors and eigenvalues of the covariance matrix, one obtains:

$$\left(\frac{R^H R}{\sigma^2} + H\right)w = \mu N^H N w \begin{cases} \Leftrightarrow \left(\frac{R^H R}{2\cdot\sigma^2} + C\cdot\Lambda^{-1}\cdot C^H\right)w = \mu N^H N w \\ \Leftrightarrow \left(\frac{C^H R^H R C}{2\cdot\sigma^2} + \Lambda^{-1}\right)y = \mu C^H N^H N C y \end{cases}$$

where $y = C^H w$.

After determining the vector y from the previous expression, the interference reduction module 14 computes the weighting vector w according to the relation:

$$w = C \cdot y.$$

In the equation above, the matrices C and Λ can advantageously be reduced by removing a certain number of their eigenvalues as described above.

Of course, other embodiments may also be envisaged.

More particularly, the covariance matrices may be computed dynamically in order to take account of the variations of the constraints of the channel.

It is also possible to take account of other parameters while computing the covariance matrices, particularly delay profiles etc.

The invention claimed is:

1. A method for reducing interference in a receiver comprising at least two antennas each receiving a signal transmitted through an associated radio propagation channel, the received signals corresponding with the same emitted signal comprising frames of symbols distributed in time and frequency, among which some symbols, called pilot symbols, are known to the receiver, where the said method comprises the following steps:
    weighting of each of the signals received with a weighting vector associated respectively with a respective antenna of the receiver;
    combination of the weighted signals received to obtain a combined received signal;
    weighting of a reference signal comprising pilot symbols with another weighting vector;
    comparison of the combined received signal and the weighted reference signal to obtain an error; and
    determination of the weighting vectors using a maximum a posteriori criterion by maximising the probability of realisation of the said weighting vectors conditionally with the error obtained.

2. A method according to claim 1, in which the determination step includes the following sub-steps:
    computation of a covariance matrix $G_B$ of the propagation channel;
    computation of a covariance matrix $G_D$ of the propagation channel convoluted with itself; and
    determination of the weighting vectors using the covariance matrices $G_B$ and $G_D$.

3. A method according to claim 2, wherein the determination step further comprises a sub-step consisting in decomposing the covariance matrix $G_B$ into eigenvectors according to the relation $G_B = C_B \Lambda_B C_B^H$ in which $C_B$ is an eigenvector matrix of the matrix $G_B$ and $\Lambda_B$ is a diagonal matrix comprising the eigenvalues associated with the eigenvectors of the matrix $G_B$ and a sub-step consisting in decomposing the covariance matrix $G_D$ into eigenvectors according to the relation $G_D = C_D \Lambda_D C_D^H$ in which $C_D$ is an eigenvector matrix of the matrix $G_D$ and $\Lambda_D$ is a diagonal matrix comprising the eigenvalues associated with the eigenvectors of the matrix $G_D$.

4. A method according to claim 3, wherein the determination step further comprises a sub-step consisting in extracting a matrix $C'_B$ from the matrix $C_B$ and a matrix $\Lambda'_B$ from the matrix $\Lambda_B$, the matrix $\Lambda'_B$ comprising a definite number $n_B'$ of eigenvalues of $\Lambda_B$ and the matrix $C'_B$ comprising the eigenvectors associated with these $n_B'$ eigenvalues, and a sub-step consisting in extracting a matrix $C'_D$ from the matrix $C_D$ and a matrix $\Lambda'_D$ from the matrix $\Lambda_D$, the matrix $\Lambda'_D$ comprising a definite number $n_D'$ of eigenvalues of $\Lambda_D$ and the matrix $C''_D$ comprising the eigenvectors associated with those $n_D'$ eigenvalues, the weighting vectors being then determined using the eigenvector matrices $C''_B$ and $C'_D$ and eigenvalue matrices $\Lambda'_B$ and $\Lambda'_D$.

5. A method according to claim 3, wherein the covariance matrix $G_B$ is the Kronecker product of a covariance matrix $G_{B,T}$ in the time domain and a covariance matrix $G_{B,F}$ in the frequency domain and the covariance matrix $G_D$ is the Kronecker product of a covariance matrix $G_{D,T}$ in the time domain and a covariance matrix $G_{D,F}$ in the frequency domain, and the determination step comprises the following sub-steps:
    decomposition of the covariance matrices $G_{B,T}$ and $G_{B,F}$ into eigenvectors according to the relations $G_{B,T} = C_{B,T} \Lambda_{B,T} C_{B,T}^H$ and $G_{B,F} = C_{B,F} \Lambda_{B,F} C_{B,F}^H$, in which:
    $C_{B,T}$ is an eigenvector matrix of the matrix $G_{B,T}$;
    $\Lambda_{B,T}$ is a diagonal matrix comprising eigenvalues associated with the eigenvectors of the matrix $G_{B,T}$;
    $C_{B,F}$ is an eigenvector matrix of the matrix $G_{B,F}$; and
    $\Lambda_{B,F}$ is a diagonal matrix comprising eigenvalues associated with the eigenvectors of the matrix $G_{B,F}$;
    extraction of a matrix $C'_{B,T}$ from the matrix $C_{B,T}$ and a matrix $\Lambda'_{B,T}$ from the matrix $\Lambda_{B,T}$, the matrix $\Lambda'_{B,T}$ comprising a definite number $n_{Bt}'$ of the largest eigenvalues of $\Lambda_{B,T}$ and the matrix $C'_{B,T}$ comprising the eigenvectors associated with these $n_{Bt}'$ largest eigenvalues;
    extraction of a matrix $C'_{B,F}$ from the matrix $C_{B,F}$ and a matrix $\Lambda'_{B,F}$ from the matrix $\Lambda_{B,F}$, the matrix $\Lambda'_{B,F}$ comprising a definite number $n_{Bf}'$ of the largest eigenvalues of $\Lambda_{B,F}$ and the matrix $C'_{B,F}$ comprising the eigenvectors associated with these $n_{Bf}'$ largest eigenvalues,
    decomposition of the covariance matrices $G_{D,T}$ and $G_{D,F}$ into eigenvectors according to the relations $G_{D,T} = C_{D,T} \Lambda_{D,T} C_{D,T}^H$ and $G_{D,F} = C_{D,F} \Lambda_{D,F} C_{D,F}^H$, in which:
    $C_{D,T}$ is an eigenvector matrix of the matrix $G_{D,T}$;
    $\Lambda_{D,T}$ is a diagonal matrix comprising eigenvalues associated with the eigenvectors of the matrix $G_{D,T}$;
    $C_{D,F}$ is an eigenvector matrix of the matrix $G_{D,F}$; and
    $\Lambda_{D,F}$ is a diagonal matrix comprising eigenvalues associated with the eigenvectors of the matrix $G_{D,F}$;
    extraction of a matrix $C'_{D,T}$ from the matrix $C_{D,T}$ and a matrix $\Lambda'_{D,T}$ from the matrix $\Lambda_{D,T}$, the matrix $\Lambda'_{D,T}$ comprising a definite number $n_{Dt}'$ of the largest eigenvalues of $\Lambda_{D,T}$ and the matrix $C'_{D,T}$ comprising the eigenvectors associated with these $n_{Dt}'$ largest eigenvalues; and
    extraction of a matrix $C'_{D,F}$ from the matrix $C_{D,F}$ and a matrix $\Lambda'_{D,F}$ from the matrix $\Lambda_{D,F}$, the matrix $\Lambda'_{D,F}$ comprising a definite number $n_{dF}'$ of the largest eigenvalues of $\Lambda_{D,F}$ and the matrix $C'_{D,F}$ comprising the eigenvectors associated with these $n_{dF}'$ largest eigenvalues, the weighting vectors being then determined using the eigenvector matrices $C'_{B,T}, C'_{B,F}, C'_{D,T}, C'_{D,F}$ and the eigenvalue matrices $\Lambda'_{B,T}, \Lambda'_{B,F}, \Lambda'_{D,T}, \Lambda'_{D,F}$.

6. A method according to claim 1, in which the emitted signal is a multicarrier signal, particularly an OFDM signal.

7. A method according to claim 1, wherein the method steps are executed by one or more processors.

8. Reception equipment comprising at least two antennas capable, each, of receiving a signal transmitted through an associated radio propagation channel, the received signals corresponding with the same emitted signal comprising frames of symbols distributed in time and frequency, among which some symbols, called pilot symbols, are known to the receiver, where the said reception equipment comprises means for the following:

weighting of each of the signals received with a weighting vector associated respectively with a respective antenna of the receiver;

combination of the weighted signals received to obtain a combined received signal;

weighting of a reference signal comprising pilot symbols with another weighting vector;

comparison of the combined received signal and the weighted reference signal to obtain an error; and determination of the weighting vectors using a maximum a posteriori criterion by maximising the probability of realisation of the said weighting vectors conditionally with the error obtained.

* * * * *